United States Patent
Jobson et al.

(12)

(10) Patent No.: US 6,467,258 B1
(45) Date of Patent: Oct. 22, 2002

(54) METHOD AND ARRANGEMENT FOR CONTROL OF AIR-FUEL RATIO OF COMBUSTION ENGINE

(75) Inventors: Edward Jobson, Romelanda; Lars Sandberg, Göteborg; Staffan Lundgren, Hindås, all of (SE)

(73) Assignee: AB Volvo (SE)

( * ) Notice: Subject to any disclaimer, the term of this patent is extended or adjusted under 35 U.S.C. 154(b) by 0 days.

(21) Appl. No.: 09/666,686

(22) Filed: Sep. 20, 2000

Related U.S. Application Data

(63) Continuation of application No. PCT/SE99/00392, filed on Mar. 15, 1999.

(30) Foreign Application Priority Data

Mar. 20, 1998 (SE) .......................... 9800952-5

(51) Int. Cl.[7] .................................. F01N 3/00
(52) U.S. Cl. .......................... 60/285; 60/274; 60/280; 60/297
(58) Field of Search .................. 60/285, 274, 295, 60/297, 283, 280, 301

(56) References Cited

U.S. PATENT DOCUMENTS

| | | | | |
|---|---|---|---|---|
| 5,437,153 A | * | 8/1995 | Takeshima et al. | ........... 60/276 |
| 5,609,135 A | * | 3/1997 | Ogawa et al. | .............. 123/325 |
| 5,875,761 A | * | 3/1999 | Fujieda et al. | .............. 123/399 |
| 5,934,072 A | * | 8/1999 | Hirota et al. | ................. 60/301 |
| 6,009,965 A | * | 1/2000 | Takanohashi et al. | ...... 180/65.2 |
| 6,032,461 A | * | 3/2000 | Kinugasa et al. | ............. 60/295 |
| 6,079,204 A | * | 6/2000 | Sun et al. | ..................... 60/274 |
| 6,109,025 A | * | 8/2000 | Murata et al. | ................. 60/297 |
| 6,188,944 B1 | * | 2/2001 | Kolmanovsky et al. | ....... 701/54 |

\* cited by examiner

*Primary Examiner*—Thomas Denion
*Assistant Examiner*—Binh Tran
(74) *Attorney, Agent, or Firm*—Howrey, Simon, Arnold & White LLP; Diana D. Brehob; Allan J. Lippe

(57) ABSTRACT

A method and arrangement for control of a combustion engine (11) having control elements (4, 5, 17) for generation of an air/fuel mixture to each cylinder (3) of the engine (1), an exhaust system (7, 8) which is connected to the engine (1), an exhaust catalyst (10) and a NOx absorbent (11) which are provided in the exhaust system (7, 8), which method comprises: control of the control elements (4, 5, 17) in a first operating condition for generation of a comparatively lean exhaust gas mixture to the NOx adsorbent (11) for adsorption of NOx compounds in the exhaust gas mixture, and control of the control elements (4, 5, 17) in a second operating condition for generation of a comparatively rich exhaust gas mixture to the NOx absorbent (11) for desorption of NOx compounds in the exhaust gas mixture. The invention is characterized in that it comprises: detection of whether at least one condition in the vehicle prevails which corresponds to an initiation of a change-over from the first operating condition to the second operating condition, wherein all adjustment of the air/fuel mixture to the engine (1) is carried out, wherein the generation of a rich exhaust gas mixture is initiated for desorption of NOx compounds in the $NO_x$ adsorbent (11) depending on the conditions.

28 Claims, 3 Drawing Sheets

METHOD AND ARRANGEMENT FOR CONTROL OF AIR-FUEL RATIO OF COMBUSTION ENGINE

RELATED PATENT APPLICATIONS

This is a continuation patent application of International Application Number PCT/SE99/00392 filed Mar. 15, 1999 also entitled METHOD AND ARRANGEMENT FOR CONTROL OF AIR-FUEL RATIO OF COMBUSTION ENGINE and which designates the United States. The full disclosure of said application, in its entirety, is hereby expressly incorporated by reference into the present application.

TECHNICAL FIELD

The present invention relates to a method for control of a combustion engine and the arrangement of a combustion engine having means for generation of an air/fuel mixture to each cylinder of the engine, an exhaust system which is connected to the engine, an exhaust catalyst and a $NO_x$ adsorbent which are provided in the exhaust system thereof. The invention is particularly intended for use in the field of regeneration of a $NO_x$ adsorbent which is arranged in connection with a combustion engine. In a particularly preferred embodiment, the invention takes the form of a device for control of a combustion engine including means for generation of an air/fuel mixture to each cylinder of the engine, an exhaust system which is connected to the engine, an exhaust catalyst and a $NO_x$ adsorbent which are provided in the exhaust system. The generating mean(s) are adapted to assume: a first operating condition that delivers a comparatively lean exhaust gas mixture to the $NO_x$ adsorbent for adsorption of $NO_x$ compounds in the exhaust gas mixture; and a second operating condition that delivers a comparatively rich exhaust gas mixture to the $NO_x$ adsorbent for desorption of $NO_x$ compounds in the exhaust gas mixture.

BACKGROUND OF THE INVENTION

In the field of vehicles which are operated by combustion engines, there is a general demand for low emissions of harmful substances in the exhaust gases from the engine. These substances are primarily considered to be pollutants and often take the form of nitrogen oxide compounds ($NO_x$), hydrocarbon compounds (HC), and carbon monoxide (CO). Regards today's petrol engines, the exhaust gases are normally purified by means of an exhaust catalyst, which forms part of the exhaust system and through which the exhaust gases are guided. In what is often referred to as a three-way catalyst, which is previously known, the major part of the above-mentioned harmful compounds are eliminated by catalytic reactions. In order to optimize the function of the catalyst so that it provides an optimal degree of purification for $NO_x$, HC, and CO, the engine is in most operating cases operated by a stoichiometric air/fuel mixture, i.e. a mixture where $\lambda=1$.

Although today's three-way catalysts normally have a very high degree of purification which strongly reduces the emissions of harmful pollutants into the atmosphere, there are demands today for additional reductions of the emissions of such harmful substances. These demands originate from among other things, increasingly strict legislation in various countries, with associated demands for extremely low emissions of $NO_x$, CO, and HC compounds.

Furthermore, in the field of vehicles, there is a general demand for reducing the fuel consumption of the engine to the highest possible degree. To this end, during the last few years, engines have been developed having new types of combustion chambers in the engine's cylinders, particularly in order for the engine to be able to be operated by increasingly lean fuel mixtures, i.e. where $\lambda=1$. Such engines are generally termed "lean-burn" engines. In one type referred to as a DI engine (i.e. a direct-injected Otto cycle engine), the respective combustion chamber in the engine is constructed in such a manner that the supplied fuel can be concentrated to a high degree at the respective spark plug. During continues driving, such engines can be operated by a very lean air/fuel mixture, approximately $\lambda=4$. For this reason, a substantial savings in fuel consumption is obtained using this type of engine.

Due to the fact that a DI engine is normally operated by a very lean air/fuel mixture, a correspondingly lean exhaust gas mixture will flow through the three-way catalyst. This results in the three-way catalyst being unable to reduce the $NO_x$ compounds in the exhaust gases (due to the fact that it is constructed for an optimal degree of purification for a stoichiometric mixture). For this reason, a conventional three-way catalyst can be combined with a nitrogen oxide adsorbent (also called $NO_x$ adsorbent, or "$NO_x$ trap"), which is a per se a known device, for absorption of $NO_x$ compounds, e.g. in the exhaust gases from a combustion engine. In this manner, the $NO_x$ adsorbent can be installed and utilized as a complement to a conventional three-way catalyst.

A $NO_x$ adsorbent can be arranged either as a separate unit upstream of a conventional three-way catalyst, or alternatively as an integral part of the three-way catalyst, i.e. together with the catalytic material of the three-way catalyst. The $NO_x$ adsorbent is constructed in such a manner that it takes up (adsorbs) $NO_x$ compounds from the exhaust gases if the engine is operated by a lean air/fuel mixture and gives off (desorbs) $NO_x$ compounds if the engine is operated by a rich air/fuel mixture during a certain time period. Furthermore, the $NO_x$ adsorbent has the property of being able only to adsorb $NO_x$ compounds up to a certain limit, i.e. it is eventually "filled" and thus reaches a limit for adsorption. In this situation, the $NO_x$ adsorbent must be regenerated, i.e. it must be influenced to desorb, and thus to release the accumulated $NO_x$, compounds. If a conventional three-way catalyst is arranged downstream of the $NO_x$ adsorbent, the desorbed $NO_x$ compounds can be eliminated by means of the three-way catalyst, provided that the latter has reached its ignition temperature.

According to known designs, the regeneration of the $NO_x$ adsorbent can be accomplished by making the exhaust gas mixture through the $NO_x$ adsorbent comparatively rich during a certain time period, which in turn can be achieved by means of the engine being operated by a comparatively rich air/fuel mixture for a short time period, e.g. a few seconds. In this manner, the $NO_x$ adsorbent is "emptied" so that it thereafter can adsorb $NO_x$ compounds during a certain time period which lasts until a new regeneration becomes necessary.

Such regeneration is known to be obtainable by means of a control of the air concentration in the exhaust gas mixture through the $NO_x$ adsorbent. A system for such a control is disclosed in the U.S. Pat. No. 5,461,857 which discloses an engine having an exhaust gas filter system that in turn comprises a three-way catalyst, an oxidation catalyst and a $NO_x$ adsorbent. According to this known system, an air/fuel mixture is combusted in the engine's combustion chamber, wherein the exhaust gases from the engine are fed through the three-way catalyst in a known manner. Furthermore, the system contains an air pump for supplying secondary air to the exhaust pipe at a position between the three-way catalyst and the $NO_x$ adsorbent. By means of the supply of secondary air, the exhaust gas mixture through the $NO_x$ adsorbent can be made lean. In this manner, the reduction of the $NO_x$ compounds in the exhaust gases takes place in two steps, i.e. in the three-way catalyst, as well as in the $NO_x$ adsorbent. In such a system, the $NO_x$ adsorbent can be regenerated by interruption of the supply of the secondary air. This provides a pulse with a comparatively rich exhaust gas mixture to the $NO_x$ adsorbent, by means of which it is regenerated.

Although this known system in principle operates satisfactorily, it has, however, certain drawbacks. Primarily, in can be noted that the system requires a number of different constructional details to supply the secondary air (i.e. a secondary air pump, air conduits, valves, and connections for the air conduits to the exhaust system). These components must be assembled in connection with the engine, which causes the system to become unnecessarily expensive as regards the cost for the components, as well as for its assembly in the vehicle in question.

Another drawback relates to the fact that the driver of the vehicle normally perceives this regenerative process disadvantageous to comfort if the $NO_x$ adsorbent is regenerated too often. This results because the production of rich exhaust gas pulses can be perceived as "jerky," and consequently, disturbing to the driver.

In view of the above described deficiencies associated with conventionally designed regenerative $NO_x$ adsorbent systems, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventionally designed regenerative $NO_x$ adsorbent systems and incorporates several additional beneficial features.

One object of the present invention is to provide an improved method for purification of harmful emissions from a combustion engine. In particular, the invention is intended for control of a combustion engine having: means that controls the air/fuel mixture to each cylinder of the engine, an exhaust system which is connected to the engine, and an exhaust catalyst and $NO_x$ adsorbent which are both provided in the exhaust system. The invention controls the means to a first operating condition for generating a comparatively lean exhaust gas mixture to the $NO_x$ adsorbent for causing adsorption of $NO_x$ compounds from said exhaust gas mixture. In a second operating condition, the control means causes the generation of a comparatively rich exhaust gas mixture to said $NO_x$ adsorbent for causing desorption of $NO_x$ compounds back into the exhaust gas mixture. The invention is characterized in that it comprises detection of whether at least one condition in the vehicle prevails which corresponds to an initiation of a change-over from said first operating condition to said second operating condition, wherein an adjustment of said air/fuel mixture to the engine is carried out. The generation process of a rich exhaust gas mixture is initiated for desorption of $NO_x$ compounds from the $NO_x$ adsorbent depending on said condition.

Through the utilization of the invention, several advantages are accomplished. Primarily, it can be noted that the invention provides a reduced fuel consumption for the engine in question, which is due to fact that the $NO_x$ adsorbent is regenerated at optimal points as regards the fuel consumption. More precisely, the regeneration occurs during such occasions where an increase of moment occurs in the engine anyway. As a result, according to the invention, no additional, separate occasions (which per se would result in an increased fuel consumption) need to be utilized in order to regenerate the $NO_x$ adsorbent. Furthermore, by means of the invention, reduced emissions are obtained as compared with previously known systems. Also, a higher degree of comfort is obtained for the vehicle's passengers, which is due to the fact that the passengers, to a less extent than in known systems, feel impacts and similar disturbances during driving.

According to a preferred embodiment, the invention includes detecting the amount of $NO_x$ compounds in the exhaust gases from the engine. This results in that the invention permits a control of a possible sulphur detoxification in the $NO_x$ adsorbent, which in turn enables a prolonged life for the $NO_x$ adsorbent. Furthermore, it becomes possible to drive with different fuel qualities for the engine, e.g. fuel which contains a certain amount of sulphur, which is due to the fact that the invention provides a control for possible sulphur detoxification. In this manner, the invention permits the engine system to be flexible as regards different fuel qualities (e.g. fuels having different $NO_x$ levels).

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
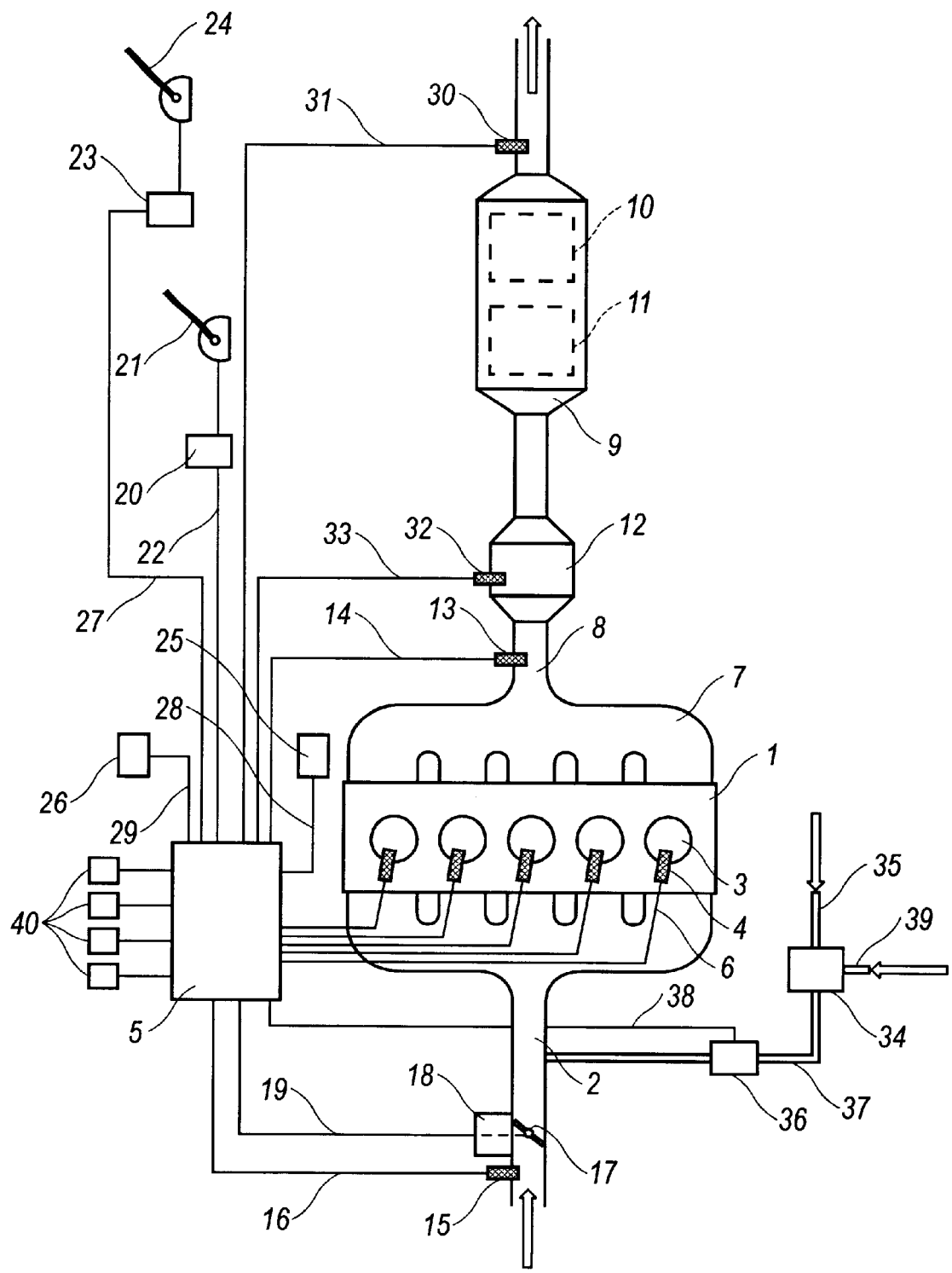
FIG. 1 is a schematic diagram of an arrangement including a combustion engine, an in which an embodiment of the present invention is incorporated.

FIG. 1 shows a schematic view of an arrangement according to the present invention. According to a preferred embodiment, the invention is arranged in connection with a combustion engine 1 which can be a conventional petrol or diesel engine, but which preferably is constituted by a so-called DI engine, i.e. an engine of the direct-injected Otto cycle engine type, where the injection of fuel to the engine 1 is adapted for a "stratified" operation, i.e. where the supplied fuel can be concentrated in each combustion chamber of the engine so that the engine can be operated by a very lean air/fuel mixture, approximately $\lambda=4$, during certain predetermined operating conditions. With such an engine, considerable fuel savings are obtained as compared with engines which are operated by a stoichiometric mixture, i.e. where $\lambda=1$. Such an engine is also adapted for a "homogeneous" operation, i.e. with a stoichiometric or a comparatively rich mixture.

In a conventional manner, the engine 1 is supplied with inflowing air via an air inlet 2. Furthermore, the engine 1 is provided with a number of cylinders 3 and a corresponding number of fuel injectors 4. Each injector 4 is connected to a central control unit 5 via an electrical connection 6. Preferably, the control unit 5 is computer based and is adapted to control the fuel supply to each injector 4 with fuel from a fuel tank (not shown) in a known manner so that a constantly adapted air/fuel mixture is fed to the engine 1. The engine 1 according to the illustrated embodiment is formed in accordance with a "multi-point" injection type, where the correct amount of fuel to the engine 1 can be supplied individually to each injector 4 in a known manner.

During operation of the engine 1, the control unit 5 is adapted to control the air/fuel mixture to the engine 1 so that at all times it is being adapted to the prevailing operating condition. The control of the engine 1 occurs in an essentially known manner depending on various parameters which reflect the operating condition of the engine 1 and the vehicle in question. For example, the control of the engine 1 can occur depending on the prevailing gas supply, the engine speed, the amount of injected air to the engine and the oxygen concentration in the exhaust gases.

The engine 1 that is shown in the drawing is of a five-cylinder type. However, it shall be noted that the invention can be utilized in engines having various numbers of cylinders and various cylinder configurations. Preferably, the injectors 4 are of the type in which the fuel is directly injected into each cylinder 3, but the invention can also be utilized in so-called "port injected" engines. Furthermore, the invention can in principle be utilized for a so-called "single point" injection as well, wherein a single fuel injector is provided in the inlet to the engine.

The exhaust gases from the engine 1 are guided out from the cylinders 3 via a branch pipe 7 and further to an exhaust pipe 8 which is connected to the branch pipe 7. Preferably, an exhaust catalyst 9 is provided further downstream along the exhaust pipe 8, which exhaust catalyst in turn is constructed of a conventional three-way catalyst 10 and a $NO_x$ adsorbent 11. The $NO_x$ adsorbent 11 is of a per se previously known type and is thus adapted for adsorbing the $NO_x$ compounds which are flowing out from the engine 1 via the exhaust pipe 8. Preferably, the $NO_x$ adsorbent 11 is provided within the same housing as the three-way catalyst 10, either as a separate block or completely integrally formed with the three-way catalyst 10 (i.e. as a unit which is formed together with the catalytic material of the three-way catalyst 10). Independently of the form that is selected, the $NO_x$ adsorbent 11, by means of a broken line, is schematically indicated in the drawing as a separate unit. Thus, the exhaust gases from the engine 1 flow through the exhaust pipe 8, through the catalyst package 9 and then further out into the atmosphere.

According to what has been mentioned above, the engine 1 can take the form of a DI engine, wherein the air/fuel mixture to the respective cylinders 3 can be approximately $\lambda=4$ during normal driving. During operation with such a lean mixture, the $NO_x$ compounds which form part of the exhaust gases from the engine 1 will not be reduced by means of the three-way catalyst 10, but will instead be adsorbed by the $NO_x$ adsorbent 11.

According to this embodiment, the engine 1 is provided with an electrically heatable start-up catalyst 12, which in turn is connected to a source of power (not shown) and is, adapted to be activated during cold starts of the engine 1. The purpose of the start-up catalyst 12 is to reduce the ignition time of the three-way catalyst 10, i.e., the time that passes until the catalyst 10 has. been heated to a temperature at which it is capable of reducing a predetermined part of the harmful substances in the exhaust gases. By heating the start-up, catalyst 12 electrically, the heating time for the three-way catalyst 10 can be reduced. This provides an improved exhaust purification, especially during cold starts of the engine 1.

Furthermore, the system comprises a sensor 13 for detecting the oxygen concentration in the exhaust gases. Preferably, the sensor 13 is of the linear lambda probe type and is connected to the control unit 5 via an electrical connection 14. Preferably, the sensor 13 is arranged in the exhaust pipe 8, upstream of the start-up catalyst 12, but other locations are also possible, e.g. between the start-up catalyst 12 and the $NO_x$ adsorbent 11.

An air flow meter 15 is provided in the air inlet 2. The air flow meter 15, which per se is previously known, is connected to the control unit 5 via an additional connection 16 and emits a measuring signal which constitutes a measure of the amount of air that flows into the engine 1. Furthermore, the system comprises a gas throttle 17 which preferably is electrically controllable. To this end, the gas throttle 17 is provided with a controllable positioning motor 18, by means of which the gas throttle 17 can be set in a certain desired position so that a suitable amount of air is fed into the engine 1 depending on the prevailing operating condition. Thus, the positioning motor 18 is connected to the control unit 5 via an additional connection 19. For the control of the gas throttle 17, the system also comprises a position indicator 20 for the vehicle's accelerator pedal 21. The position indicator 20 detects the position of the accelerator pedal 21 and supplies a signal regarding its position (i.e. a signal, the value of which corresponds to the prevailing gas supply) to the control unit 5 via an additional connection 22.

Furthermore, the control unit 5 is connected to several additional indicators, which are indicated schematically in FIG. 1. Preferably, these indicators are constituted by a position indicator 23 for the position of the vehicle's brake pedal 24, an engine speed indicator 25 for the detection of the speed of the engine 1 and a pressure indicator 26 for detection of the pressure in a brake booster (not shown) in the vehicle. The indicators 23, 25, and 26 are connected to the control unit 5 via corresponding electrical connections 27–29.

Preferably, the system also comprises a $NO_x$ sensor 30, i.e. an indicator for detecting the concentration of $NO_x$ compounds in the exhaust gases. The $NO_x$ sensor 30 is connected to the control unit 5 via an additional electrical connection 31. The $NO_x$ sensor 30 can be arranged in various positions in the exhaust system, e.g. between the start-up catalyst 12 and the $NO_x$ adsorbent 11, or, as in the drawing, downstream of the three-way catalyst 10. Furthermore, a temperature indicator 32 is preferably provided in connection with the start-up catalyst 12. The temperature indicator 32 is connected to the control unit 5 via an additional electrical connection 33 and supplies a signal which corresponds to the temperature of the start-up catalyst 12. The signal from the temperature indicator 32 can also be utilized for determination of a measure of the temperature of the $NO_x$ adsorbent 11. Also, as an alternative to the temperature indicator 32, or as a complement to it, a measure of the temperature of the $NO_x$ adsorbent 11 can be determined by utilizing a predetermined mathematical model which is stored in the control unit 5. For example, such a model can utilize previously known relations between the temperatures in the start-up catalyst 32 and the $NO_x$ adsorbent 11.

Furthermore, the system according to the illustrated embodiment is provided with an exhaust canister 34 for absorption of fuel vapors from the vehicle's fuel tank. In a previously known manner, these fuel vapors are guided through a fuel line 35 and through the canister 34, which contains active carbon. At regular intervals, the canister 34 must undergo a regeneration (so-called "purging"), which is accomplished by opening a particular purge valve 36 which is positioned along a line 37 between the canister 34 and the air inlet 2 of the engine 1. The purge valve 36 is electrically controllable and to this end, it is connected to the control unit 5 via an electrical connection 38. The control unit 5 is adapted for opening the purge valve 36 in accordance with predetermined points of time and driving conditions. During the purging function, a prevailing negative pressure at the inlet side of the engine 1 will result in air, which is supplied via an air conduit 39, being fed through the canister 34 thereby emptying the canister 34. In this manner, the fuel vapors which have been collected in the canister 34 will be guided back to the engine's air inlet 2 in order to be combusted in the engine accordingly. Due to the fact that additional fuel is supplied as a result of the purging function, the control unit must adjust the amount of fuel that is supplied via each injector 4 in accordance therewith.

Furthermore, the system is preferably provided with an anti-spin function, i.e. the control unit 5 is adapted to detect tendencies towards wheel spinning in the vehicle, which can occur e.g. during acceleration or hard taking of corners. To this end, the system preferably comprises four sensors 40 for detection of the speed of each wheel. In this manner, the control unit 5 (on the basis of the speed of each wheel and of other operating parameters in the vehicle) can control the engine 1 so that wheel spinning stops or is prevented. Several different methods for obtaining this may be utilized. For example, the engine can be controlled so that the fuel supply to each cylinder completely or partially ceases in the event of detected wheel spinning. This results in that the output power of the engine decreases, which stops any tendencies towards wheel spinning.

The function of the invention will now be described in detail. In the case of the engine 1 being constituted by a DI engine, it can be operated by a very lean air/fuel mixture during normal, continuous operation; more precisely a mixture, the lambda value of which is approximately $\lambda=4$. This results in that the exhaust gas mixture which flows through the exhaust pipe 8 and reaches the $NO_x$ adsorbent 11 will be very lean as well. According to known principles, the $NO_x$ adsorbent will then adsorb those $NO_x$ compounds which are present in the exhaust gas mixture. After a certain time of driving with a lean exhaust mix, normally approximately 1–2 minutes, the $NO_x$ adsorbent 11 will be "filled", i.e. its catalytic material will be saturated. This implies that the $NO_x$ adsorbent 11 no longer can absorb $NO_x$ compounds from the exhaust gas mixture. At this stage, the $NO_x$ adsorbent 11 must be regenerated.

A fundamental principle behind the invention is that said regeneration is initiated when at least one of certain predetermined operating conditions prevail. One example of such a condition which can be utilized according to the invention is a condition which corresponds to an intentional change of torque of the engine 1. For example, such a condition can be generated by the behavior of the driver (e.g. by means of the driver applying the throttle to a certain extent). When the driver, for example, wishes to overtake another and thus increases the degree of throttle application, the vehicle will accelerate. Resultingly, the control unit 5 is adapted to supply a comparatively rich air/fuel mixture to the engine 1 during acceleration of the vehicle. For example, the engine 1 can be constructed so that it delivers its maximal torque during an air/fuel mixture which corresponds to $\lambda=0.9$. An acceleration results in that the driver will expect an increase of torque from the engine. This condition can be utilized in order to simultaneously regenerate the $NO_x$ adsorbent completely or partially. To this end, when this condition is detected, the control unit is adapted to maintain a comparatively rich exhaust gas mixture to the $NO_x$ adsorbent for a certain period of time which, all in all, provides the desired regeneration of the $NO_x$ adsorbent. Thus, an advantage is achieved as regards the driver's comfort and experience, since the driver in this case will not perceive it as a disadvantage if a rich pulse at the same time (as the acceleration occurs) is generated for regeneration of the $NO_x$ adsorbent. Furthermore, advantages are achieved as regards the fuel consumption of the vehicle, which is due to the fact that existing changes of torque of the engine 1 are utilized for the regeneration process when rich air/fuel conditions otherwise naturally occur.

Figure 2:
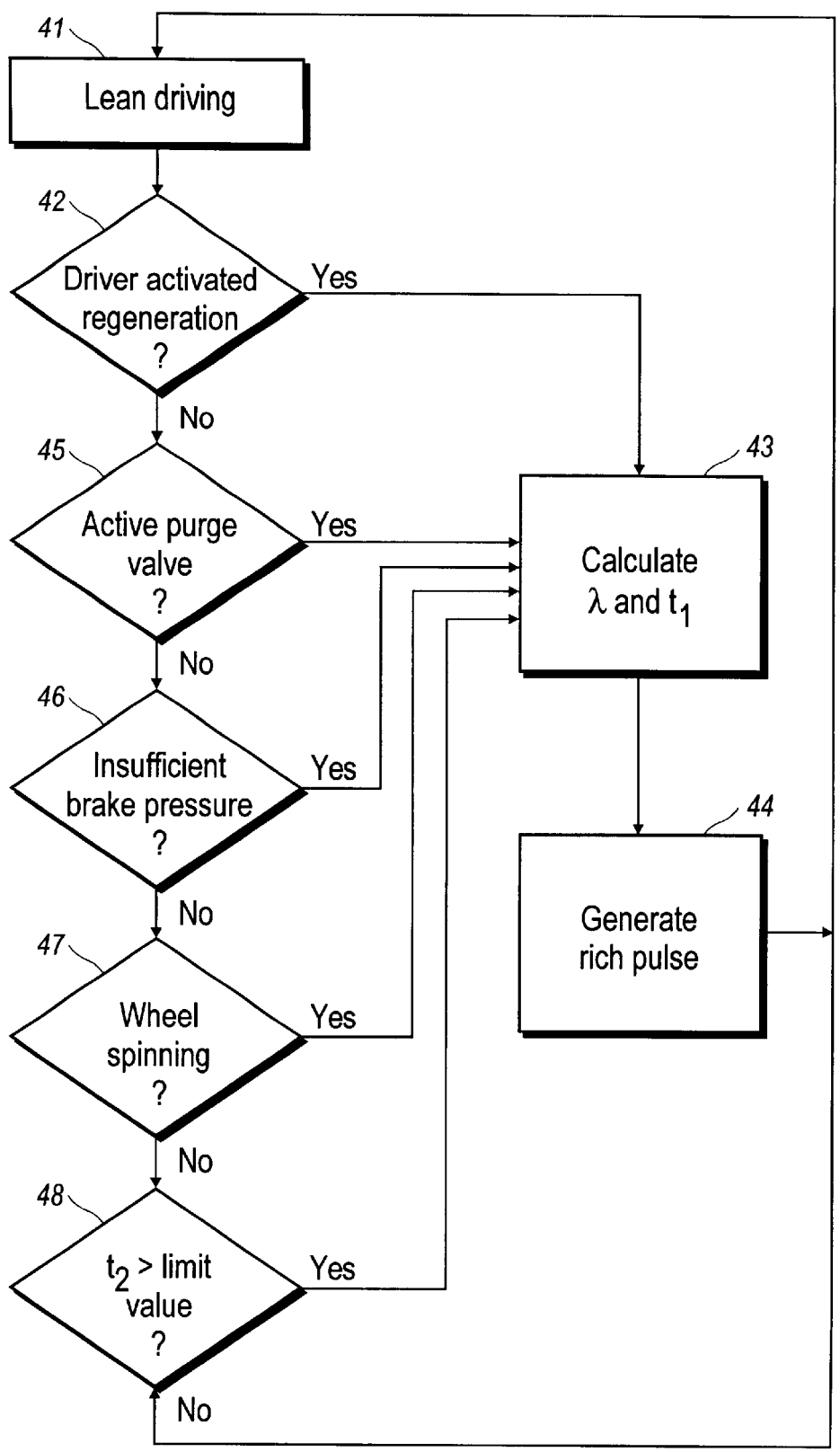
FIG. 2 is a flow diagram demonstrating an exemplary functioning of the invention.
Figure 3:
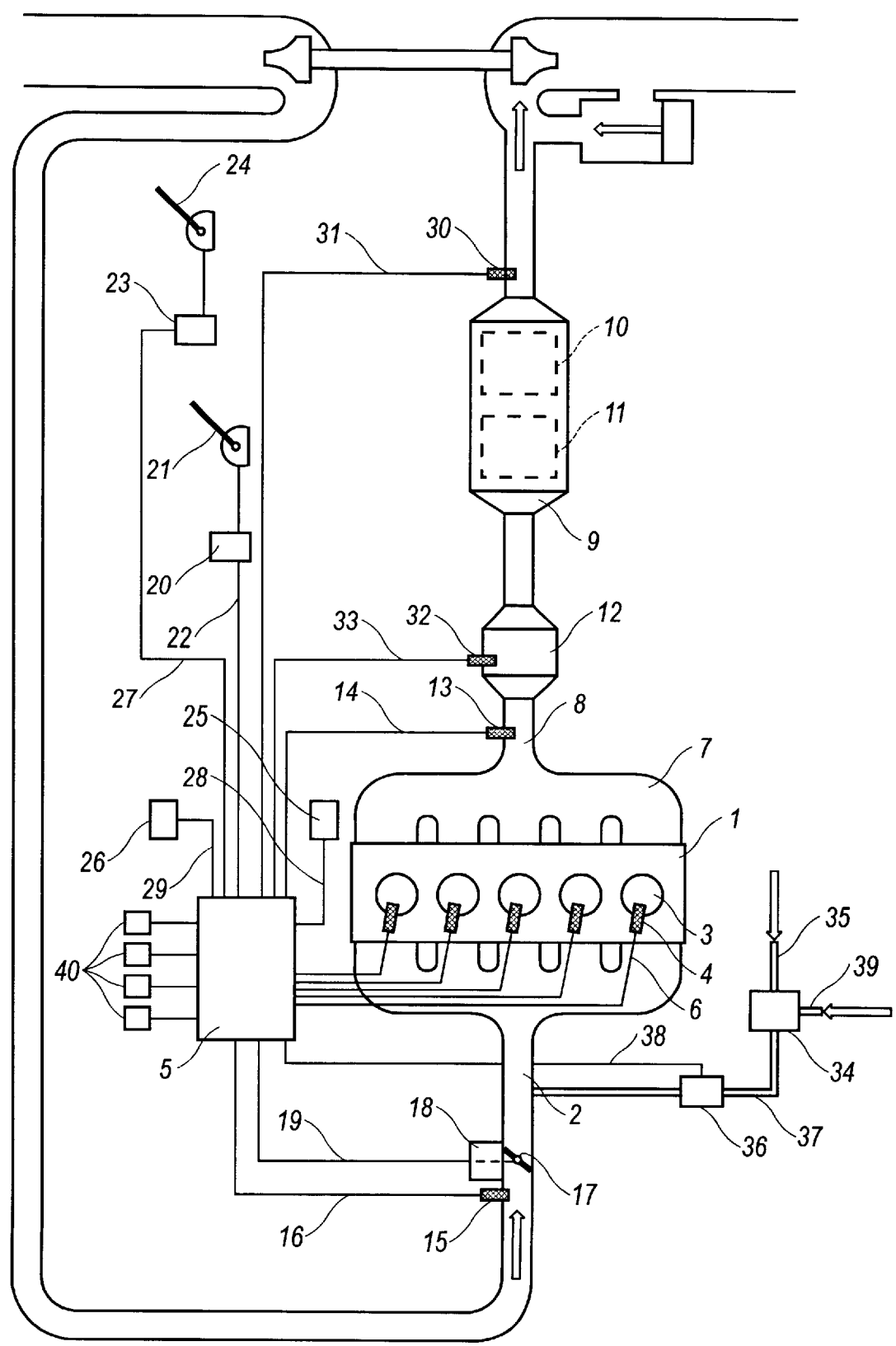
FIG. 3 is a schematic diagram of another embodiment of an arrangement according to FIG. 1 including a turbo aggregate and waste gate value.

FIG. 2 shows a slightly simplified flow chart which describes the function of the invention. The invention is particularly suited to be utilized in those cases where the engine 1 is constituted by a DI engine which is adapted so that it during certain operating conditions, e.g. during continuous driving at medium-high loads, is operated by a comparatively lean exhaust gas mixture (see square 41). During such an operation, a control takes place when any one of certain predetermined operating conditions prevails. The object of this control is to allow a regeneration of the $NO_x$ adsorbent if at least one such operating condition prevails. Thus, the control unit 5 is adapted to detect whether a condition which corresponds to an intentional change of torque in the form of a "driver activated regeneration" prevails (see square 42), and in that case to generate a rich pulse. This means that the control unit 5 is adapted to detect the angle position of the accelerator pedal 21, which takes place by means of the position indicator 20. If the degree of throttle application exceeds a predetermined limit value, i.e. if the opening rate of the gas throttle 17 exceeds a certain limit value, the control unit 5 will assume that "driver activated regeneration" prevails. In this case, the control unit 5 will determine a suitable composition of the air/fuel mixture which must be fed to the engine in order for or the $NO_x$ adsorbent to be able to be regenerated. Normally, a comparatively rich mixture is then selected, e.g. a mixture having a $\lambda$-value which is approximately 0.7–0.8. This mixture must be present during a certain time period, $t_1$, which is necessary in order for the $NO_x$ adsorbent to be completely regenerated; The value of the time period, $t_1$, which corresponds to the present condition can be based on measurements which are made from experience and are determined by means of the control unit 5. According to what will be described in detail hereinafter, this time period, $t_1$, can be selected to have a value which may vary from a tenth of a second to a few seconds.

When the control unit has determined suitable values for the $\lambda$-relation for a regeneration and the time period $t_1$ during which the regeneration shall continue (see square 43), the control unit 5 will initiate regeneration by controlling the air and fuel supply to the engine 1 so that the calculated rich exhaust gas mixture is obtained (see square 44) during the measured time period. In this regard, the fuel supply to the injectors 4 is controlled (see FIG. 1) so that the desired mixture is obtained depending also on e.g. the amount of supplied air to the engine. This "rich pulse" will be generated at the same time as the driver accelerates. The driver will then not notice any difference regarding the comfort if the regeneration of the $NO_x$ adsorbent occurs at the same time.

The value of the time period $t_1$ which is necessary in order for the $NO_x$ adsorbent 11 to be completely regenerated depends on operating parameters such as the working speed and the load of the engine 1 and the present coefficient of fullness of the $NO_x$ adsorbent 11. On the basis of known parameters which define the $NO_x$ adsorbent's 11 size and the speed by means of which it is filled during lean operation, the control unit can be adapted to continuously determine a value regarding its coefficient of fullness. In this manner, the regeneration can be limited to only the time which is necessary for it to be substantially emptied of $NO_x$ compounds. If, for example, the $NO_x$ adsorbent 11 at a certain torque when the driver activated regeneration is detected is half filled with $NO_x$ compounds and thus presents a coefficient of fullness of 50%, the time period $t_1$ can be selected to be a comparatively low value. If, however, the $NO_x$ adsorbent discloses a coefficient of fullness which in principle is 100%, a comparatively high value is demanded for the time period $t_1$ in order for the $NO_x$ adsorbent to be completely regenerated.

The above-described "driver activated regeneration" is one example of how the $NO_x$ adsorbent 11 can be regenerated as a result of an intentional change of torque of the engine 1. Other examples of intentional changes of torque which can be utilized for the regeneration are activation of a possible cruise control system in the vehicle, connection and disconnection of an air-conditioning system and connection and disconnection of a system for stability control of the vehicle. All of these actions result in changes of torque during which a regeneration of the $NO_x$, adsorbent 11 can be carried out.

As an alternative to the above-described operating manner, the invention also can be arranged so that a partial regeneration of the $NO_x$ adsorbent is made, i.e. a regeneration which not necessarily has to continue until the $NO_x$ adsorbent is completely emptied of $NO_x$ compounds. This may, for example, come into question if a certain operating condition should demand that a comparatively rich air/fuel mixture only can be delivered to the engine for a certain limited period of time. In that case, the $NO_x$ adsorbent will only be partly emptied of $NO_x$ compounds. The control unit is, however, adapted to continuously store a value of the coefficient of fullness, which then is the basis for the next regeneration of the $NO_x$ adsorbent.

An additional condition which can be detected for the regeneration of the $NO_x$ adsorbent is whether the above-mentioned purging function is activated, i.e. depending on whether the purge valve 36 (see FIG. 1) is activated (see square 45). According to the invention, if the control unit establishes that the purge valve is active, the $NO_x$ adsorbent can be regenerated as well. In this case, the course of events proceeds to calculation of a suitable λ-value and a time period $t_1$ during which a rich exhaust gas pulse through the $NO_x$ adsorbent shall be present (see square 43). In this manner, according to the invention, a regeneration of the $NO_x$ adsorbent is caused to occur essentially at the same time as the purge valve is activated.

An additional condition which can be detected and utilized in connection with regeneration of the $NO_x$ adsorbent is whether a certain predetermined pressure prevails in the vehicle's brake booster (see square 45). Normally, today's vehicles utilize a brake booster which comprises a vacuum chamber having a connection to the inlet of the engine, wherein a negative pressure can be generated in the vacuum chamber during operation of the engine. This pressure is utilized for providing the desired brake power in the brake system. In accordance with the invention, the above-mentioned pressure indicator 26 (cf. FIG. 1) is therefore utilized for measurement of this pressure. If the pressure differs from a predetermined limit value, the engine is controlled so that the air/fuel mixture is changed so that the desired pressure in the inlet of the engine can be secured. According to the described embodiment, if this situation is detected by the control unit (see square 46), a regeneration will also be initiated, wherein the control unit determines a suitable λ-value and a time period during which a rich exhaust gas pulse through the $NO_x$ adsorbent shall be present (see square 43). In this manner, the invention provides an automatic control function as well, since it guarantees that a predetermined pressure prevails in the brake booster.

By means of the position indicator 23 forming part of the brake pedal 24, the regeneration of the $NO_x$ adsorbent also can be controlled depending on the position of the vehicle's brake pedal 24. If, for example, the driver brakes, this condition can be utilized in order to initiate said regeneration.

As an alternative to a detection of the position of the brake pedal 24, the system also can utilize a signal from a pressure indicator (not shown) which detects the brake pressure in the vehicle's brake circuit.

An additional condition which can be utilized for regeneration of the $NO_x$ adsorbent is whether the control unit activates the above-mentioned spinning control function (see square 47). If a tendency towards spinning is detected by means of the wheel speed indicators 40 (see FIG. 1), the engine will be controlled so that a reduced engine power is obtained, by means of which the wheel spinning can be stopped. This situation can also be utilized in order to achieve a regeneration, wherein the control unit calculates a suitable λ-value and a time period $t_1$ during which a rich exhaust gas pulse through the $NO_x$ adsorbent shall be present in order for the desired regeneration to occur (see square 43). Thereafter, the rich pulse (see square 44) is generated.

The above-mentioned operating conditions of the engine and the vehicle can be said to be of the "existing" operating conditions type which can occur in the vehicle during its normal operation and which result in that the air/fuel mixture that is fed to the engine must be adjusted. A fundamental idea behind the invention is that these existing operating conditions can be utilized in order to simultaneously initiate a regeneration of the $NO_x$ adsorbent.

If none of the previous operating conditions prevails, the $NO_x$ adsorbent must still be regenerated when it is filled. If, for example, the vehicle in question is driven for a longer time period without any acceleration occurring (i.e. without any "driver activated regeneration" occurring), it will still be necessary to regenerate the $NO_x$ adsorbent when it has been filled. This corresponds to a regeneration after a certain maximal time has passed from the latest regeneration. Thus, if a time $t_2$ which has passed from the latest regeneration exceeds a certain limit value (which can be established by the control unit), a compulsory regeneration is executed (see square 48). In this case, the course of events proceeds to determine a suitable λ-value and a time period $t_1$ during which a rich exhaust gas pulse through the $NO_x$ adsorbent is required (see square 43). Based thereupon, regeneration is activated (see square 44).

As regards the calculation of a λ-value and a time period $t_1$ during which a rich exhaust gas pulse shall to be present, these two parameters can vary depending on the current operating condition. For example, a rich pulse having a comparatively high λ-value (e.g. 0.9) can be utilized if the driver applies a certain heavy degree of throttle application. Other λ-values can be utilized during other operating conditions, and also depending on e.g. which input signal is utilized or depending on e.g. the catalyst in question. Furthermore, regarding all the above-mentioned operating conditions, values for the λ-relation and the time period $t_1$ can be determined depending on the present coefficient of fullness of the $NO_x$ adsorbent 11, i.e. depending on how extensive the regeneration is demanded to be for the torque. Furthermore, and for example, comparatively high λ-values can require a longer time period $t_1$ than lower λ-values. In most cases, the time period $t_1$ can be selected to be a value which is approximately in the interval of 0.5 to 5.0 seconds.

The temperature of the start-up catalyst can also be utilized for determination of the λ-value and the time period $t_1$. To this end, the control unit can be provided with a table which provides a correction of the λ-value and/or the time period $t_1$ depending on the temperature value that is measured by means of the temperature indicator 32 (cf. FIG. 1), possibly in combination with a software-executed estimation of the temperature of the $NO_x$ adsorbent 11, in accordance with what has been described hereinabove.

According to an alternative embodiment of the invention, the regeneration (if the $NO_x$ adsorbent can also be carried out depending on a weighing of several parameters, which is intended to indicate to what degree regeneration is necessary. In this case, the function according to square 43 is supplemented with a function according to the following. At first, the control unit detects whether one or several of the conditions according to squares 41, 42, 45, or 46 of FIG. 2 prevails. If that is the case, a summation is carried out by calculating a sum where every verified condition is given a weighted value that is added to this sum. If the sum exceeds a certain predetermined limit value, the control unit assumes that a regeneration of the $NO_x$ adsorbent is necessary. This results in it calculating a λ-value and a time period $t_1$ during which a rich exhaust gas pulse through the $NO_x$ adsorbent is present. From this calculation, a rich pulse is generated (see square 44).

According to an additional embodiment of the invention, the above-mentioned $NO_x$ sensor 30 (see FIG. 1) can be utilized for a control of the function of the $NO_x$ adsorbent. The control unit can detect the amount of $NO_x$ compounds out from the engine by means of the signal from the $NO_x$ sensor 30. If this amount differs from a certain predetermined amount (which can be based upon a predetermined model), this can be an indication of the fact that e.g. sulphur detoxification of the $NO_x$ adsorbent is present. This may imply a failing adsorption capacity of the $NO_x$ adsorbent.

As an alternative to regeneration of the $NO_x$ adsorbent, the invention can comprise a control of the fuel so that the injection of a certain fuel pulse occurs late during the work cycle of the cylinder, instead of providing a rich fuel mixture. If the control unit is arranged so that this late injection occurs while each cylinder's exhaust valve is kept open, an excess of HC will be generated in the exhaust gases. This provides essentially the same effect for the regeneration as if a rich pulse had been generated.

The invention is not limited to the embodiments which are described above or which are shown in the drawings, but may be varied within the scope of the appended claims. For example, the invention can in principle be utilized without any electrically heatable start-up catalyst 12. As an alternative, the start-up catalyst 12 can also be replaced by a start-up catalyst which is not electrically heatable but which nevertheless is formed for providing a reduced heating time for the complete catalyst arrangement. Furthermore, the invention can be utilized with a conventional gas throttle as well as an electrically controlled gas throttle.

Still further, the limit value that is utilized during the driver activated regeneration (cf. FIG. 2, square 42) can vary with respect to time. For example, this limit value can be reduced gradually and concurrently with the parameter $t_2$; that is, the time which has passed from the latest regeneration approaches the limit value for a compulsory regeneration (cf. square 48).

Also, the invention can be adapted so that regeneration of the $NO_x$ adsorbent 11 occurs at points in time which are selected optimally as regards certain predetermined parameters, such as for example the exhaust gas flow, the exhaust gas temperature, whether "purging" of the canister 34 occurs, etcetera. To this end, the control unit 5 can comprise stored information which for these parameters defines, for example, how much fuel is consumed during a regeneration, depending on the speed of the vehicle. By choosing to regenerate the $NO_x$ adsorbent 11 at optimal points of time as regards such operating conditions, the fuel consumption for the vehicle in question can be optimized.

Furthermore, the invention can be utilized in connection with engines which are provided with turbo aggregates. In such an engine, the regeneration can be complicated due to the fact that the rich exhaust gas pulses which are utilized for the regeneration of the $NO_x$ adsorbent are guided through an exhaust gas turbine forming part of the turbo aggregate. This can result in that lean and rich exhaust gas pulses are mixed in a manner which is disadvantageous to the regeneration. This problem can be solved according to an alternative embodiment of the invention which is adapted to control a waste-gate valve of an electrically controllable type which forms part of the turbo aggregate. When a comparatively rich exhaust gas pulse is guided out from the engine, the waste-gate valve can be opened synchronously with the exhaust gas pulse. In this manner, the exhaust gas pulse is then guided through the waste-gate valve, essentially without being guided through said exhaust gas turbine.

A method and arrangement for a regenerative $NO_x$ adsorbent system has been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A method for controlling a combustion engine in a vehicle having a generation means for generating of an air/fuel mixture to each cylinder of the engine, an exhaust system connected to the engine, and an exhaust catalyst and a $NO_x$ adsorbent which are each provided in the exhaust system, said method comprising the steps of:

controlling said generation means in a first mode of operation for generating a comparatively lean exhaust gas mixture to said $NO_x$ adsorbent for adsorption of $NO_x$ compounds from said exhaust gas mixture;

controlling said generation means in a second mode of operation for generation of a comparatively rich exhaust gas mixture to said $NO_x$ adsorbent for desorption of $NO_x$ compounds into said exhaust gas mixture;

detecting whether at least one predetermined driving condition in the vehicle occurs which corresponds to an initiation of an existing function in the vehicle which in turn allows operation in said second mode of operation, and, in case of such a condition being detected, regenerating said $NO_x$ adsorbent essentially simultaneously with the occurrence of said condition, said generation of a relatively rich exhaust gas mixture being initiated for desorption of $NO_x$ compounds in the $NO_x$ adsorbent; and detecting a pressure condition of a brake booster being provided in the vehicle, wherein said pressure condition is constituted by the fact that said pressure exceeds a predetermined limit value.

2. The method according to claim 1, wherein said driving condition is constituted by an operating condition of said engine.

3. The method according to claim 2, wherein said condition is constituted by an intentional change of torque of said engine.

4. The method according to claim 2, further comprising:
detecting a degree of throttle application of the engine, wherein said condition is constituted by the fact that the degree of throttle application exceeds a predetermined limit value.

5. The method according to claim 1, further comprising:
activating a purge valve for flushing a canister provided in said vehicle, wherein said condition is constituted by the fact that said purge valve is activated.

6. The method according to claim 1, further comprising:
detecting a position condition of a brake pedal provided in the vehicle, wherein said position condition is constituted by the fact that said position exceeds a predetermined limit value.

7. The method according to claim 1, further comprising:
detecting a pressure condition of a brake circuit provided in the vehicle, wherein said pressure condition is constituted by the fact that said pressure exceeds a predetermined limit value.

8. The method according to claim 1, further comprising:
detecting a wheel spin condition of at least one of the wheels of the vehicle, wherein said wheel spin condition is constituted by the fact that wheel spinning occurs in the vehicle.

9. The method according to claim 1, wherein said at least one driving condition is at least two in number, said method further comprising weighing at least two different such conditions, wherein each condition is assigned a predetermined weighted value which are added together, and wherein the initiation of said rich exhaust gas mixture occurs if the total value exceeds a predetermined limit value.

10. The method according to claim 1, further comprising the step of carrying out a compulsory generation of a rich exhaust gas mixture when a certain time period has passed from a previous generation of a rich exhaust gas mixture if said conditions have not been detected.

11. The method according to claim 1, further comprising the step of determining a lambda value for the air/fuel mixture which is fed to the engine and the time period during which said rich pulse is generated depending on the prevailing operating condition of the engine and of components which are provided in connection with the engine.

12. The method according to claim 11, wherein said lambda value and said time period are determined depending on the prevailing coefficient of fullness of the $NO_x$ adsorbent.

13. The method according to claim 1, wherein said engine is of the direct-injected Otto cycle engine type.

14. The method according to claim 1, further comprising the steps of:
forming said exhaust system with a turbo aggregate having a controllable waste-gate valve, and
controlling said waste-gate valve into an open condition substantially at the same time as said generation of a rich exhaust gas mixture is initiated.

15. A method for controlling a combustion engine in a vehicle having a generation means for generating of an air/fuel mixture to each cylinder of the engine, an exhaust system connected to the engine, and an exhaust catalyst and a $NO_x$ adsorbent which are each provided in the exhaust system, said method comprising the steps of:

controlling said generation means in a first mode of operation for generating a comparatively lean exhaust gas mixture to said $NO_x$ adsorbent for adsorption of $NO_x$ compounds from said exhaust gas mixture;

controlling said generation means in a second mode of operation for generation of a comparatively rich exhaust gas mixture to said $NO_x$, adsorbent for desorption of $NO_x$ compounds into said exhaust gas mixture;

detecting whether at least one predetermined driving condition in the vehicle occurs which corresponds to an initiation of an existing function in the vehicle which in turn allows operation in said second mode of operation, and, in case of such a condition being detected, regenerating said $NO_x$ adsorbent essentially simultaneously with the occurrence of said condition, said generation of a relatively rich exhaust gas mixture being initiated for desorption of $NO_x$ compounds in the $NO_x$ adsorbent; and detecting a wheel spin condition of at least one of the wheels of the vehicle, wherein said wheel spin condition is constituted by the fact that wheel spinning occurs in the vehicle.

16. The method according to claim 15, wherein said driving condition is constituted by an operating condition of said engine.

17. The method according to claim 16, wherein said condition is constituted by an intentional change of torque of said engine.

18. The method according to claim 16, further comprising:
detecting a degree of throttle application of the engine, wherein said condition is constituted by the fact that the degree of throttle application exceeds a predetermined limit value.

19. The method according to claim 15, further comprising:
activating a purge valve for flushing a canister provided in said vehicle, wherein said condition is constituted by the fact that said urge valve is activated.

20. The method according to claim 15, further comprising:
detecting a pressure condition of a brake booster being provided in the vehicle, wherein said pressure condition is constituted by the fact that said pressure exceeds a predetermined limit value.

21. The method according to claim 15, further comprising:
   detecting a position condition of a brake pedal provided in the vehicle, wherein said position condition is constituted by the fact that said position exceeds a predetermined limit value.

22. The method according to claim 15, further comprising:
   detecting a pressure condition of a brake circuit provided in the vehicle, wherein said pressure condition is constituted by the fact that said pressure exceeds a predetermined limit value.

23. The method according to claim 15, wherein said at least one driving condition is at least two in number, said method further comprising weighing at least two different such conditions, wherein each condition is assigned a predetermined weighted value which are added together, and wherein the initiation of said rich exhaust gas mixture occurs if the total value exceeds a predetermined limit value.

24. The method according to claim 15, further comprising the step of carrying out a compulsory generation of a rich exhaust gas mixture when a certain time period has passed from a previous generation of a rich exhaust gas mixture if said conditions have not been detected.

25. The method according to claim 15, further comprising the step of determining a lambda value for the air/fuel mixture which is fed to the engine and the time period during which said rich pulse is generated depending on the prevailing operating condition of the engine and of components which are provided in connection with the engine.

26. The method according to claim 25, wherein said lambda value and said time period are determined depending on the prevailin coefficient of fullness of the $NO_x$ adsorbent.

27. The method according to claim 15, wherein said engine is of the direct-injected Otto cycle engine type.

28. The method according to claim 15, further comprising the steps of:
   forming said exhaust system with a turbo aggregate having a controllable waste-gate valve, and
   controlling said wastegate valve into an open condition substantially at the same time as said generation of a rich exhaust gas mixture is initiated.

* * * * *